3,271,495
PROCESS FOR BIAXIALLY ORIENTING
POLYPROPYLENE FILM
Le Roy Frederick Gronholz, Richmond, Va., and James Maurice Quinn, Tonawanda, N.Y., assignors to E. I. du Pont de Nemours and Company, Wilmington, Del., a corporation of Delaware
No Drawing. Original application Aug. 31, 1961, Ser. No. 135,115. Divided and this application Jan. 21, 1965, Ser. No. 435,109
11 Claims. (Cl. 264—210)

This application is a divisional application of our copending application Serial No. 135,115, filed August 31, 1961, which in turn is a continuation-in-part of our copending application Serial No. 855,021, filed November 24, 1959, and now abandoned.

This invention relates to a process for improving the properties of polypropylene film. More particularly, it relates to a process for preparing a relatively stiff, highly durable, biaxially oriented polypropylene film.

A practical method for the production of a highly durable, biaxially oriented polypropylene film has not heretofore been realized. Polypropylene film, unlike other polymeric films, cannot be stretched satisfactorily in two directions. After drawing or elongating polypropylene film in one direction, attempts to draw the film in a direction perpendicular to the first direction resulted invariably in line drawing or sharp necking down of the film. The thickness of the final film was not readily controlled and was usually non-uniform. In many instances, the film tore before adequate drawing could be accomplished in the second direction. Where drawing in the second direction was accomplished, only very thin films were obtained and their physical properties, particularly the strength characteristics in the second direction, were much different from the properties of the film in the first direction.

Furthermore, when using the film, for example, when wrapping articles on an automatic package wrapping machine or in a bag making machine or even when hand wrapping with film, the film must be fairly stiff as well as strong. A limp film, even though it may be strong, cannot be used efficiently for wrapping. For wrapping heavy objects, the film must be, besides strong and stiff, relatively thick (at least about one mil) to provide the required durability.

It is an object of the present invention to provide a process for biaxially orienting polypropylene film. Other objects will appear hereinafter.

The objects are accomplished by a process which comprises the steps, in sequence, of extruding a molten polypropylene resin at a temperature of at least 15° C. above the crystalline melting point of the resin, usually 190° C.–325 C. and preferably 220° C.–260° C., in the form of a film; quenching the film at a temperature of from −75° C. to 15° C., usually −25° C. to 15° C.; heating the film to a temperature within the range of from 36° C. to 10° C. below the crystalline melting point of the resin, i.e., 130° C.–155° C., preferably 130° C.–145° C.; stretching the film at least two times its original dimension, usually from 2× to about 8×, in a direction transverse to the direction of extrusion at a rate of at least 350% per minute, preferably at least 900% per minute, while maintaining its temperature within said range; and, thereafter, stretching the film longitudinally (in the direction extrusion) from 2× to about 8× its length while maintaining the temperature of the film not more than 20° C. above, preferably not more than 10° C. above the temperature used in the previous transverse stretching step; and cooling the biaxially oriented polypropylene film while holding it under tension to prevent any substantial change in its dimensions.

The following table provides a correlation between crystalline melting point and density for a variety of polypropylene resins.

| Density of resin (grams/c.c.): | Crystalline melting point (°C.) |
|---|---|
| 0.8825 | 141 |
| 0.8912 | 152 |
| 0.9014 | 165 |
| 0.9092 | 173 |
| 0.9123 | 179 |

A particularly preferred process comprises the steps of melt extruding a polypropylene resin in the form of a film 6–25 mils thick at a temperature of 220° C.–260° C.; cooling the film rapidly in ice water at a temperature between 0° C. and 5° C.; heating the cooled film to a temperature of from 130° C. to 145° C.; biaxially stretching the film in a sequential manner, first transversely stretching the film 3×–6× its width at a temperature, $T_1$, between 130° C.–145° C. and then longitudinally stretching the film 3×–6× its length at a temperature between $T_1$ and 10° C. above $T_1$, preferably a temperature of 5° C. above $T_1$; and cooling the film while maintaining it under tension.

The final polypropylene film is characterized by an initial tensile modulus of at least 240,000 pounds per square inch, preferably 400,000–650,000 pounds per square inch, a pneumatic impact strength of at least 3.75 kilogram-centimeters per mil, a crystallinity index of at least 55, preferably 70–95, and a tensile strength of at least 14,000 pounds per square inch in two mutually perpendicular directions, the ratio of tensile strength in one direction to tensile strength in the direction perpendicular to the first direction being between 1 and 1.75. The film is further characterized by a melt index of 0.1–10, preferably 3–5; a crystalline perfection index of 1–2 degrees, preferably 1.4–1.6 degrees; and an orientation angle of less than 60 degrees.

The starting polypropylene resin may be efficiently prepared using a catalyst system composed of metallic reducing agents such as metal alkyls, metal hydrides and alkaline metals, preferably an organometallic reducing agent having at least one metal-to-hydrocarbon bond and compounds, preferably the halide, of a transition metal of Groups IV–b, V–b and VI–b of the Periodic Table of the Elements such as titanium, vanadium, molybdenum, etc. The polymerization is generally carried out in the presence of an inert hydrocarbon liquid such as hexane, benzene, etc., containing the catalyst system. A wide range of conditions may be used. Thus, reaction temperatures may vary from below 0° C. to above 250° C., and pressures may vary from atmospheric pressure to 1,000 atmospheres or more. It is preferred to operate at a temperature of 25° C.–100° C. and a pressure of 1–100 atmospheres.

The polypropylene resin, which may be used in the present invention, can have an ash content of as high as 20,000 parts per million parts of polymer. Ash content is determined by burning the resin in the presence of excess sulfuric acid to convert all the metals to oxides and to oxidize all the organic material to carbon dioxide and water. The resin may have a density of 0.88–0.92, a melt index of 0.05–1.4, a half-time of crystallization at 120° C. of about 30 to 120 seconds, a crystalline melting point of about 140° C. to 180° C. and a crystallinity index of 5 to 95.

If desired, the ash content may be reduced by a variety of methods. For example, the resin after being polymerized may be washed with an alcohol such as methanol, isopropanol, butanol or an aryl alcohol. Alternatively, the resin may be washed with water containing potassium hydroxide or sodium hydroxide. Or, the resin may be treated first with a peroxide followed by a treatment with a fatty acid to reduce its ash content.

Extrusion of the polypropylene resin in the form of a film at a temperature at least 15° C. above the crystalline melting point is important. Extrusion at a temperature approaching the crystalline melting point yields a film that is very crystalline. Such a film tends to break during the subsequent stretching step or, if stretched successfully, stretches non-uniformly. To avoid any possibility of excess crystallinity during the extruding step when it is conducted at the low end of the extrusion temperature range or degradation when extruding at the upper end of the range, an extrusion temperature range of 220° C.–260° C. is preferred.

Quenching, the next step, is accomplished by contacting the film with a cooling medium; solid carbon dioxide with acetone, alcohol or ether, ice water or other liquid or, if the quench temperature is not to be very low, a solid surface of metal, ceramic or the like cooled by the flow of fluid within or by any other convenient means. Quench temperatures of −75° C. to 15° C. may be employed. However, a range of −25° C. to 15° C. is usually adequate to obtain commercially acceptable polypropylene film. A quench temperature above 15° C. results in a highly crystalline film that is difficult to stretch uniformly in the stretching step. It should be pointed out that within the commercial quench temperature range it is preferred to quench thick films (about 12 to 25 mils as extruded) within the range of −25° C. to 0° C. and thin films (from 1 to below 12 mils) within the range of 0° C. to 15° C.

After quenching, the film must be brought to a temperature of from 36° C. to 10° C. below the crystalline melting point of the polypropylene prior to stretching. It is believed that this heating step, accomplished by any convenient means, lowers the crystallinity level of the polypropylene and, thus, enables the film to be stretched. Preferably, the film is heated during this step to a temperature of 130° C.–145° C.

The next step is also a very critical step in the process. To achieve uniform biaxial orientation, the film must be stretched first in a direction transverse to the direction of extrusion while the temperature of 130° C.–145° C. is maintained and then in the direction of extrusion at a slightly higher temperature. It is sometimes advantageous to preheat the film prior to the transverse stretching step to a temperature above, i.e., about 5° C. above, that used for transverse stretching. Stretching the film in the two mutually perpendicular directions but longitudinally first does not provide the product of the present invention.

The maximum amount of stretch that should be performed in the first step, the transverse direction stretching step, depends upon the purpose for which the film is being produced. Thus, for a packaging film, it is desirable that the properties of the film be substantially similar in all directions. The film should be stretched up to about 5 or 6 times in the transverse direction and then subsequently stretched up to about 4.5 times in the longitudinal direction.

However, where the ultimate product is a tape (video, sound recording, adhesive, etc.), the amount of stretch in the first, the transverse direction, may be close to the minimum, i.e., not over about 3.5 times. For a tape, the film properties should be substantially better in the longitudinal direction. Hence, the film should be stretched to a greater extent in the longitudinal direction, up to about 6 or more times its original length. The film can be stretched up to about 3.5 times in the transverse direction and still permit a stretch of about 6 times its initial length in the longitudinal direction. As the necessary longitudinal stretch decreases from 6 times to 4.5 times the film's initial length, the maximum permitted transverse stretch in the first step rises to about 4.5 times the film's initial width.

The longitudinal direction stretch may vary from 2 to 4.5 times the initial length of the film when substantially balanced tensile properties are desired. When a film possessing enhanced unidirectional physical properties is desired, the film may be stretched up to about 6 or more times its initial length. The temperature of the film for this stretching step should be at least as high and preferably higher than that used in the first stretching step. Thus, temperatures of up to 155° C. may be used.

The rate of stretching, particularly in the transverse stretching step, is critical to the success of this process. Thus, the transverse stretch should be applied at a rate of at least 350% per minute, preferably at least 900% per minute. Below the minimum, the film tends to draw non-uniformly and, in extreme cases, line draw. The maximum rate for transverse stretching will depend on availability of equipment and may be as high as 2000–4000% per minute or higher. The success of the subsequent longitudinal stretching step does not seem to be quite so dependent on stretching rates. However, longitudinal stretching rates of 50,000–900,000% per minute are preferred.

The means for obtaining the film temperatures used in the various steps is not critical to the present invention. Thus, cooling may be obtained by blowing air or spraying liquid on the film or contacting the film with a cool surface as discussed previously. For heating, radiant or infrared methods may be used. Blowing heated air or other gaseous media on the film or contacting the film with heated surfaces may also be employed.

The stretching apparatus used is not critical either. For transverse stretching, the conventional tenter frame utilizing a chain of tenter clips which grasp the edges of the film and move outward to stretch the film may be used. For longitudinal stretching, the film may be passed between or around a pair or a series of slowly rotating rolls, which may be heated to the desired temperature, and then between or around a pair or series of rapidly rotating rolls.

The invention will be more clearly understood by referring to the examples which follow, Example 1 being the best mode contemplated for carrying out the invention.

*Example 1*

A polypropylene resin having a melt index at 190° C. of 0.25, an inherent viscosity of 1.59 and a density of 0.9012 was extruded through a flat die at 255° C. to 260° C. into an 18-mil thick film at a rate of 10 feet/minute. The extruded film was rapidly quenched by drawing it through an ice water bath held at a temperature between 0° C. and 5° C. The quenched film was then heated in an oven to a temperature of 138° C.–140° C. and was stretched at this temperature in the transverse direction 4.5 times its initial width. The film was then stretched in the longitudinal or machine direction by passing it through two sets of nip rolls, the second of which had a peripheral speed of five times the peripheral speed of the first set of rolls, while the temperature of the film was maintained at 142° C.–145° C. by regulating the temperature of the rolls. The film then passed through a third set of rolls maintained at about 50° C. to cool the film while it was being held in its stretched dimension.

The resulting 0.9 mil film had the following properties and structural characteristics:

| | Machine Direction | Transverse Direction |
|---|---|---|
| Tensile Strength, (p.s.i.) | 27,800 | 17,300 |
| Elongation (percent) | 69 | 131 |
| Initial Tensile Modulus (p.s.i.) | 518,000 | 413,000 |
| Tear Strength (grams/mil) | 10 | 14 |
| Pneumatic Impact Strength (kg.-cm./mil) | 5.06 | |
| Moisture Permeability (g./100 m.²/hr./mil) | 40 | |
| Orientation Angle (degrees) | | 16 |
| Melt Index | 16 | |
| Crystallite Perfection Index (degrees) | 0.16 | |
| Crystallinity Index | 1.4 | |
| | 72 | |

The variation in thickness of the film of the example across its width and in the longitudinal direction was less than ±10%.

When the transverse stretching was attempted at a temperature between 125° C. and 127° C., uniform drawing was not obtained and either rupturing of the film or line drawing resulted. When either the transverse or the longitudinal direction stretching was attempted at temperatures above 150° C., no advantage in drawing was obtained, that is, no improvement in the strength characteristics of the sheet was realized by such a drawing.

The details of the methods for testing and characterizing the starting and final materials in the examples follow:

*Tensile strength, elongation and initial tensile modulus* are measured at 23° C. and 50% relative humidity. They are determined by elongating the film sample (samples are cut with a Thwing-Albert cutter which cuts samples ¼" wide) in an Instron tensile tester at a rae of 100%/minute until the sample breaks. The force applied at the break in lbs./sq. in. (p.s.i.) is the tensile strength. The elongation is the percent increase in the length of the sample at breakage. Initial tensile modulus in p.s.i. is directly related to film stiffness. It is obtained from the intercept of the initial or Hookian portion of the stress/strain curve at an elongation of 1%, the film being elongated at a rate of 100% per minute. Both tensile strength and initial tensile modulus are based upon the initial cross-sectional area of the sample.

*Pneumatic impact strength* is determined by measuring the velocity of a ball mechanically accelerated by air pressure, first in free flight and then in flight immediately after being impeded by rupturing the test film sample. The velocities of the ball are measured by timing photoelectrically the passage of the steel balls between two light beams set a definite distance apart. The pneumatic impact strength is measured by the loss in kinetic energy of the ball due to the rupturing of the film sample. It is calculated from the following formula:

Constant X (square of velocity in free flight minus square of velocity in impeded flight), where the constant is directly proportional to the weight of the projectile and inversely proportional to the acceleration due to gravity.

This test is carried out at 23° C. and 50% relative humidity and the test samples are conditioned for 24 hours at 23° C. and 50% relative humidity.

*Tear strength* is measured in accordance with the procedure described in ASTM 689–44.

*Moisture permeability* is measured by placing a single sheet of the film over the top of an aluminum cup containing 15 millimeters of water, the test area being 33.3 cm.² The assembly is weighed accurately and then placed in a dry (less than 3% R.H.) air-swept oven at 39.5° C. for 48 hours. The assembly is removed from the oven, cooled to room temperature and re-weighed. The weight loss is converted to grams of water lost per 100 square meters per hour. The values given in the examples are the grams of water lost/100 m.²/hour for the second 24 hour period.

*Crystallinity index* is determined by correlating infrared measurements of the polymer with X-ray diffraction measurements. It is defined by the empirical relationship:

$$\text{Crystallinity index} = 116 \left[ \frac{A_{10.03}}{A_{10.28}} - 0.289 \right]$$

where $A_{10.03}$ is the infrared absorbence at 10.03 microns and $A_{10.28}$ is the infrared absorbence at 10.28 microns. The infrared measurements were made following the directions described in C. R. N. Strouts, J. H. Gilfillan and H. N. Wilson, "Analytical Chemistry," vol. II, Chapter 23, Oxford University Press, 1955.

*Rate or half-time of crystallization* is determined by melting a sample of the polymer and determining the time required for the sample to reach 50% of the ultimate level of crystallization as measured by infrared absorbance and calculated by the expression shown above. It is expressed as the half time of crystallization at the particular temperature employed.

*Density* of the film is measured by placing the specimen in a liquid column exhibiting a substantially linear density gradient. The level at which the specimen comes to rest is compared to the levels of standards of known densities. The density of the film specimen is obtained by interpolation between the level of the density standard. For polypropylene film it was convenient to use a water/ethanol liquid combination and to make the determination at a temperature of 23° C.

*Melt index* is measured by the method described in ASTM Test D–1238–58T.

*Crystallite perfection index* is a measure of the perfection and size of crystals and is determined by first cutting the film into long strips parallel to the machine or longitudinal direction and ¼ inch wide. Sufficient strips are cut so that when they are stacked one on top of the other and parallel to each other, the total thickness is 50 mils. This stack of films is inserted between the jaws of an edge holder 50 mils thick. When securely clamped they are cut with a razor blade. Hence, the resulting stack is 50 mils square and ¼ inch high and firmly held in the edge holder. A thin bead of cement is applied at each end. After the cement has dried, the sample is removed from the edge holder and cemented vertically to the mounting pin, which is any convenient metal, e.g. brass, aluminum, or steel, ⅛ inch diameter by ⅜ inch long. The sample is then placed on the single crystal orienter.

The orienter is disposed in an X-ray unit built by the General Electric Corporation, Milwaukee, Wisconsin, type XRD–5D1, the orienter being motorized. Details of the single crystal orienter are available in Manual No. 12130 of the General Electric Corporation. The sample is mounted in the single crystal orienter on the goniometer using the microscope supplied for this purpose to accurately align it with reference to the X-ray beam. The protractor is set at an angle, $2\theta=50°$; chi on the single crystal orienter is set to 0°. The sample is centered with reference to the microscope crosshairs by adjusting the arc and lateral movements of the goniostat. The alignment of the sample is checked at $2\theta$ angles and at chi angles of 0° and 90°. It is rotated through phi of 360° at each setting. The axes of the sample should be centered at all positions. With chi at 0° and $2\theta$ at 50°, the sample is aligned such that the plane of the film is parallel to the axis of sight. The sample is positioned finally by rotating it 25° counterclockwise, using the chi rotation. This aligns the sample with the machine direction parallel to the beam when $2\theta$ is at 0°. The X-ray diffraction peaks are recorded while continuously increasing the $2\theta$ angle at 2° a minute.

The diffraction peak used as a measure of the crystallized perfection index is at a $2\theta$ angle of 16.9°. A base line is drawn between the two least intense portions of the curve on either side of this peak. The width of the peak in degrees, half-way between this base line and the maximum of the peak, is defined as the crystallite perfection index.

*Orientation angle* is an indication of the degree of alignment of the polymer chains in the crystalline portion of the sample in a direction parallel to the major plane of the film specimen. It is also obtained from an examination of the diffraction pattern. Specifically, the orientation angle is obtained using the peak intensity at $2\theta=16.9°$. The sample is mounted as for the crystallite perfection index and $2\theta$ set at 16.9°. The sample is then rotated through the entire angular range of chi with the intensity of the X-rays diffracted being monitored. The orientation angle is measured in degrees of the line half-way between the base and the maximum of the peak parallel to the base and intercepted by each end of the curve.

This orientation angle is designated as the machine direction end orientation angle. With chi set at 0° and continuously rotating the sample through angle phi and monitoring the X-ray intensity, the transverse direction edge is similarly obtained. For a balanced film these two orientation angles should be substantially equal.

*Inherent viscosity* is defined by L. H. Cragg, J. Colloid Science I, 261–269 (1946). Inherent viscosity=$LnN_r/c$, wherein Ln is the natural logarithm, $N_r$ is the viscosity of the solution relative to the solvent, and $c$ is the concentration expressed in grams of solute per 100 ml. of solvent.

*Example 2*

A polypropylene resin having a density of 0.9023, a melt index at 190° C. of 0.21 and an inherent viscosity of 1.50 was melt extruded at 250° C.–255° C. through a flat die into a 12-mil film. The extruded film was rapidly quenched by passing it through an ice water bath held at 0° C.–5° C. The film was then heated to 130° C.–135° C. in an oven and stretched laterally to six times the initial lateral dimension. Thereafter, the film was heated to 153° C.–155° C. and was stretched to three times its initial longitudinal dimension in the manner of Example 1. The film was then cooled to room temperature while it was restrained to maintain the stretched dimensions.

The resulting 0.6 mil film had the following properties:

|  | Machine Direction | Transverse Direction |
|---|---|---|
| Tensile Strength (p.s.i.) | 14,000 | 16,500 |
| Elongation (percent) | 80 | 45 |
| Initial Tensile Modulus (p.s.i.) | 275,000 | 240,000 |
| Tear Strength (grams/mil) | 8 | 8 |
| Pneumatic Impact Strength (kg.-cm./mil) | 3.9 | |
| Moisture Permeability (g./100 m.²/hr./mil) | 47 | |
| Orientation Angle (degrees) | 22 (average) | |
| Melt Index | 0.32 | |
| Crystallite Perfection Index (degrees) | 1.5 | |
| Crystallinity Index | 70 | |

As a control, the same polypropylene resin having a density of 0.9023, a melt index at 190° C. of 0.21 and an inherent viscosity of 1.50 was melt extruded at 250° C.–255° C. through a flat die into a 12-mil film. The extruded film was rapidly quenched by passing it through the ice water bath at 0° C.–5° C. The film was then heated to 130° C.–135° C. and was stretched in the longitudinal direction to approximately 3.5 times the initial longitudinal dimension. Thereafter, the film was heated to 153° C.–155° C. and stretched to 3.5 times its initial transverse direction. The film was then cooled to room temperature while being restrained to maintain the stretched dimensions. In several trials the film ruptured when the transverse stretching was attempted. In the case where a transverse stretch was realized, line drawing occurred and a film of about 0.25 mil thickness was obtained. However, the film showed large variations in thickness. Although the major portion of the sheet was about 0.25 mil thick, there were undrawn sections as thick as 2.5 mils.

*Example 3*

A polypropylene resin having a density of 0.8980, a melt index at 190° C. of 1.66 and an inherent viscosity of 1.13 was melt extruded at 240° C. through a flat die into a 20.5-mil film. The extruded film was rapidly quenched by passing it through an ice water bath held at 15° C. The film was then heated to 130° C.–135° C. in an oven and stretched laterally to five times the initial lateral dimension. Thereafter, the film was heated to 150° C.–155° C. and was stretched to five times its initial longitudinal dimension in the manner of Example 1. The film was then cooled to room temperature while it was restrained to maintain the stretched dimensions.

The resulting 0.8 mil film had the following properties:

|  | Machine Direction | Transverse Direction |
|---|---|---|
| Tensile Strength (p.s.i.) | 30,700 | 26,100 |
| Elongation (percent) | 41 | 168 |
| Initial Tensile Modulus (p.s.i.) | 250,000 | 393,000 |
| Tear Strength (grams/mil) | 3.7 | 8 |
| Pneumatic Impact Strength (kg.-cm./mil) | 4.5 | |
| Orientation Angle (degrees) | 26 | 26 |
| Melt Index | 1.46 | |
| Crystallite Perfection Index (degrees) | 1.5 | |
| Crystallinity Index | 56 | |

As shown in the examples, the process of the present invention when performed on the prescribed starting material permits successful biaxial orientation of polypropylene films. The process may be used to produce polypropylene films having either balanced or enhanced unidirectional (unbalanced) tensile properties. The process is particularly important in producing films of all thicknesses having balanced tensile properties. However, it is also a means of producing biaxially oriented unbalanced thick films (having a final thickness greater than 1 mil) for the first time.

The process, by requiring transverse direction stretch first, also provides greater efficiency and higher production. The continuity of the longitudinal stretching which may be performed on heated rolls in a continuous manner, is not interrupted as in the prior art by the more cumbersome transverse direction stretching step.

The novel products, the biaxially oriented polypropylene films, may be used in a variety of applications. Thus, both the balanced and unbalanced polypropylene films are useful as packaging or wrapping materials, in laminates, as base supports for magnetic recording and photographic films and tapes, for measuring tapes, as a base for pressure-sensitive adhesive tapes, etc. The balanced films are particularly desirable as packaging materials for use in automatic wrapping machines.

Having fully described the invention, what is claimed is:

1. A process for biaxially orienting polypropylene film which comprises the steps, in sequence, of extruding a molten polypropylene resin at a temperature within the range of 190° C. through 325° C. in the form of a film; quenching said film at a temperature within the range of —75° C. through 15° C.; heating said quenched film to a temperature within the range of from 36° C. to 10° C. below the crystalline melting point of said resin; stretching said film at least two times its original dimension in a direction transverse to the direction of extrusion at a rate of at least 350% per minute while maining the temperature of said film at $T_1$, $T_1$ being within the range of from 36° C. to 10° C. below the crystalline melting point of said resin; and, thereafter, stretching the film longitudinally at least two times its original length while maintaining the temperature of said film at not more than 20° C. above $T_1$; and cooling said film while holding it under tension to prevent any substantial change in its dimensions.

2. A process as in claim 1 wherein said polypropylene resin is extruded at a temperature within the range of 220° C. through 260° C.

3. A process as in claim 1 wherein said film is quenched at a temperature within the range of —25° C. through 15° C.

4. A process as in claim 1 wherein said quenched film is heated to a temperature within the range of 130° C. through 145° C. for transverse stretching.

5. A process as in claim 1 wherein the film is stretched in the longitudinal direction at a temperature of not more than 10° C. above $T_1$.

6. A process as in claim 1 wherein the film is stretched in the longitudinal direction at a temperature of 5° C. above $T_1$.

7. A process as in claim 1 wherein said film is stretched from 2 times to about 8 times its original dimensions in both directions.

8. A process as in claim 1 wherein said film is stretched from 3 times to about 6 times its original dimensions in both directions.

9. A process as in claim 1 wherein said film is stretched an equal amount in both directions.

10. A process as in claim 1 wherein said film is stretched in the transverse direction at a rate of at least 900% per minute.

11. A process for biaxially orienting polypropylene film which comprises the steps, in sequence, of extruding a molten polypropylene resin at a temperature within the range of 220° C. through 260° C. in the form of a film; quenching said film at a temperature within the range of −25° C. through 15° C.; heating said quenched film to a temperature within the range of 130° C. through 145° C.; stretching said film from 3 times to about 6 times the original width of said film in a direction transverse to the direction of extrusion at a rate of at least 900% per minute while maintaining the temperature of said film at $T_1$, $T_1$ being between 130° C. and 145° C.; and, thereafter, stretching the film longitudinally from 3 times to about 6 times the original length of said film while maintaining the temperature of said film not more than 10° C. above $T_1$; and cooling said film while holding it under tension to prevent any substantial change in the dimensions of said film.

References Cited by the Examiner

UNITED STATES PATENTS

| | | | |
|---|---|---|---|
| 2,627,088 | 2/1953 | Alles et al. | 264—134 |
| 2,823,421 | 2/1958 | Scarlett | 264—216 |
| 2,952,867 | 9/1960 | Diedrich et al. | 264—98 |
| 2,961,711 | 11/1960 | Diedrich et al. | 264—237 |
| 3,013,003 | 12/1961 | Maragliano et al. | 264—210 |

FOREIGN PATENTS

| | | |
|---|---|---|
| 223,196 | 11/1957 | Australia. |
| 594,971 | 6/1959 | Italy. |

ROBERT F. WHITE, *Primary Examiner.*

S. A. HELLER, *Assistant Examiner.*